United States Patent
Miura et al.

(10) Patent No.: US 11,891,470 B2
(45) Date of Patent: Feb. 6, 2024

(54) METHOD FOR PRODUCING CHLOROPRENE-BASED-POLYMER LATEX

(71) Applicant: SHOWA DENKO K.K., Tokyo (JP)

(72) Inventors: Yuki Miura, Yokohama (JP); Yuji Hashimoto, Yokohama (JP); Keiichi Nakamura, Kawasaki (JP)

(73) Assignee: Resonac Corporation, Tokyo (JP)

( * ) Notice: Subject to any disclaimer, the term of this patent is extended or adjusted under 35 U.S.C. 154(b) by 16 days.

(21) Appl. No.: 17/612,674

(22) PCT Filed: May 13, 2020

(86) PCT No.: PCT/JP2020/019042
§ 371 (c)(1),
(2) Date: Nov. 19, 2021

(87) PCT Pub. No.: WO2020/241251
PCT Pub. Date: Dec. 3, 2020

(65) Prior Publication Data
US 2022/0242979 A1 Aug. 4, 2022

(30) Foreign Application Priority Data
May 31, 2019 (JP) .................. 2019-103105

(51) Int. Cl.
*C08F 36/18* (2006.01)
*C08F 6/00* (2006.01)

(52) U.S. Cl.
CPC .............. *C08F 36/18* (2013.01); *C08F 6/003* (2013.01)

(58) Field of Classification Search
CPC ........ C08F 232/08; C08F 234/02; C08F 8/12; C07D 321/12
See application file for complete search history.

(56) References Cited

U.S. PATENT DOCUMENTS

| | | | |
|---|---|---|---|
| 4,017,355 A | 4/1977 | Kiyota et al. | |
| 4,130,527 A | 12/1978 | Miller et al. | |
| 2011/0251345 A1 | 10/2011 | Ahmadnian et al. | |

FOREIGN PATENT DOCUMENTS

| | | | | |
|---|---|---|---|---|
| CN | 103301750 A | | 9/2013 | |
| JP | 51-11878 A | | 1/1976 | |
| JP | 51-37175 A | | 3/1976 | |
| JP | 56-41212 A | | 4/1981 | |
| JP | 2003-147016 A | | 5/2003 | |
| JP | 2006001789 A | * | 1/2006 | |
| JP | 2010-537011 A | | 12/2010 | |
| JP | 2012-524132 A | | 10/2012 | |

OTHER PUBLICATIONS

International Search Report of PCT/JP2020/019042 dated Jul. 28, 2020 [PCT/ISA/210].

* cited by examiner

*Primary Examiner* — Robert D Harlan
(74) *Attorney, Agent, or Firm* — Sughrue Mion, PLLC

(57) ABSTRACT

A method for producing a chloroprene-based polymer latex which can efficiently remove a residual volatile organic substance from the chloroprene-based polymer latex while suppressing the deposition of agglomerates is provided. In the method for producing a chloroprene-based polymer latex of the present invention, when the residual volatile organic substance comprised in the latex is volatilized and removed, a mixed fluid of one or more gases selected from the group consisting of inert gases and air, and water is contacted with the latex at a gas pressure higher than the saturated water vapor pressure, and a temperature of the mixed fluid is a temperature lower than a boiling point of water at the gas pressure.

8 Claims, 1 Drawing Sheet

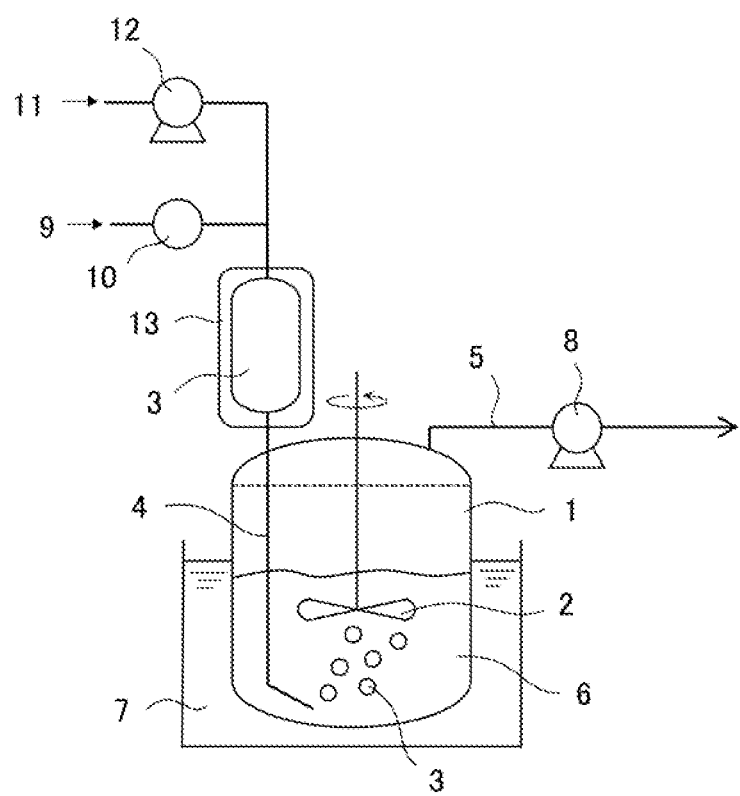

METHOD FOR PRODUCING CHLOROPRENE-BASED-POLYMER LATEX

CROSS REFERENCE TO RELATED APPLICATIONS

This application is a National Stage of International Application No. PCT/JP2020/019042, filed May 13, 2020, claiming priority to Japanese Patent Application No. 2019-103105, filed May 31, 2019.

TECHNICAL FIELD

The present invention relates to a method for producing a chloroprene-based polymer latex which can efficiently remove residual volatile organic substances such as a residual monomer and a residual organic solvent.

BACKGROUND ART

When chloroprene-based polymer latex is subjected to a stripping step or the like in its production process, chloroprene-based polymer latex is generally reduced in the concentration of residual volatile organic substances such as an unreacted monomer (residual monomer) in polymerization reaction to 1% by mass or less.

However, awareness of influence which volatile organic substances have on the environment or the human body is growing in recent years, residual volatile organic substances in chloroprene-based polymer latex have been required to be further reduced therewith.

As techniques for removing residual volatile organic substances from chloroprene-based polymer latex, heating evaporation and distillation at reduced pressure, stripping in which water vapor is introduced into latex, the promotion of volatilization by spraying latex, and the like are known.

For example, Patent Literature 1 describes a method in which polymer latex is forcedly circulated in a circulation circuit and heated with an external heat exchanger, and a residual monomer is removed by evaporation.

Patent Literature 2 describes a method for reducing a residual monomer by spraying a polymer dispersion liquid vertically (perpendicularly below) and radially in a container and discharging an evaporated monomer from the upper part of the container.

Patent Literature 3 describes a method in which water vapor is fed to a polychloroprene dispersion material in a stripping tower, and chloroprene which is a residual monomer is discharged from the top of the tower.

CITATION LIST

Patent Literature
PTL 1: JP 2003-147016 A
PTL 2: JP 51-37175 A
PTL 3: JP 2012-524132 A

SUMMARY OF INVENTION

Technical Problem

In all the methods as described in the above-mentioned Patent Literatures 1 to 3, residual volatile organic substances are removed by treating chloroprene-based polymer latex at high temperatures of more than 60° C.

However, the methods had a problem that when chloroprene-based polymer latex was treated at high temperature, agglomerates deposit easily by the evaporation of moisture, the solid concentration decreases, and the treatment had to be stopped due to the clogging of piping for the circulation of chloroprene-based polymer latex and gas, or the like. For this reason, operations for removing agglomerates in chloroprene-based polymer latex at high temperature and in the treatment system need to be conducted frequently to remove residual volatile organic substances safely while maintaining the properties of chloroprene-based polymer latex.

The present invention has been completed to solve the problems as mentioned above, and an object of the present invention is to provide a method for producing a chloroprene-based polymer latex which can efficiently remove residual volatile organic substances from the chloroprene-based polymer latex while suppressing the deposition of agglomerates.

Solution to Problem

The present invention is based on the finding that, according to stripping with a mixed fluid of inert gas and the like and water, residual volatile organic substances can be efficiently removed from chloroprene-based polymer latex, and the deposition of agglomerates can be suppressed, for example, even at comparatively low temperature such 60° C. or less.

That is, the present invention provides the following [1] to [7].

[1] A method for producing a chloroprene-based polymer latex, wherein when a residual volatile organic substance comprised in the latex is volatilized and removed, a mixed fluid of one or more gases selected from the group consisting of inert gases and air, and water is contacted with the latex at a gas pressure higher than a saturated water vapor pressure at a liquid temperature of the latex, and a temperature of the mixed fluid is a temperature lower than a boiling point of water at the gas pressure.

[2] The method for producing a chloroprene-based polymer latex according to the above-mentioned [1], wherein the temperature of the latex contacted with the mixed fluid is 10 to 60° C.

[3] The method for producing a chloroprene-based polymer latex according to the above-mentioned [1] or [2], wherein the temperature of the mixed fluid contacted with the latex is 10 to 60° C.

[4] The method for producing a chloroprene-based polymer latex according to any one of the above-mentioned [1] to [3], wherein the mixed fluid is contacted with the latex by blowing the mixed fluid into the latex liquid.

[5] The method for producing a chloroprene-based polymer latex according to any one of the above-mentioned [1] to [4], wherein a concentration of the residual volatile organic substance comprised in the latex before the latex is contacted with the mixed fluid is 150 to 10000 ppm by mass based on a total mass of the latex.

[6] The method for producing a chloroprene-based polymer latex according to any one of the above-mentioned [1] to [5], wherein the concentration of the residual volatile organic substance comprised in the latex is reduced to less than 150 ppm by mass based on the total mass of the latex.

[7] The method for producing a chloroprene-based polymer latex according to any one of the above-mentioned [1] to [6], wherein the residual volatile organic substance is a residual monomer in polymerization reaction in production of the latex.

Advantageous Effects of Invention

According to the present invention, residual volatile organic substances can be efficiently removed from chloroprene-based polymer latex in the production of the latex while the deposition of agglomerates is suppressed.

BRIEF DESCRIPTION OF DRAWINGS

FIG. 1 shows a schematic diagram of a device used for implementing a test on removing residual volatile organic substances in chloroprene-based polymer latex in the Examples.

DESCRIPTION OF EMBODIMENTS

Hereinafter, a method for producing a chloroprene-based polymer latex of the present invention will be described in detail. "Removal" mentioned in the present invention means removing at least a part.

The method for producing a chloroprene-based polymer latex of the present invention is characterized in that when residual volatile organic substances contained in chloroprene-based polymer latex (hereinafter also called merely latex) are volatilized and removed, a mixed fluid of one or more gases selected from the group consisting of inert gases and air (hereinafter also called inert gas and/or the like), and water is contacted with the latex at a gas pressure higher than saturated water vapor pressure at a liquid temperature of the latex, and temperature of the mixed fluid is temperature lower than a boiling point of water at the gas pressure.

According to the above-mentioned production method, the deposition of agglomerates can be suppressed, and the residual volatile organic substances in the latex can be efficiently removed by contacting the mixed fluid of the inert gas and/or the like, and water with the latex under the conditions of predetermined gas pressure and temperature.

[Chloroprene-Based Polymer Latex]

Chloroprene-based polymer latex is an emulsion in which a chloroprene-based polymer is stably dispersed in water. As long as the stable dispersion state is maintained, the solid concentration of the latex is not particularly limited. The solid concentration is preferably 40 to 70% by mass, more preferably 42 to 65% by mass, and further preferably 45 to 62% by mass.

The solid concentration of the latex herein is the ratio of the mass of the dry residue to the mass of the latex before drying when the latex is warmed and dried at 140° C. for 25 minutes.

The chloroprene-based polymer is a polymer using chloroprene (2-chloro-1,3-butadiene) as a monomer, and may be a homopolymer in which a monomer is only chloroprene, or may be a copolymer of chloroprene and another monomer.

Examples of the other monomer copolymerized with chloroprene include, but are not particularly limited to, 2,3-dichloro-1,3-butadiene, butadiene, isoprene, styrene, acrylonitrile, acrylic acid, esters thereof, methacrylic acid, and esters thereof. These may be used alone or in combination of two or more.

The monomers constituting the copolymer preferably contain chloroprene as the main ingredient, and the content of chloroprene is preferably 70.0 to 99.9% by mass, more preferably 75.0 to 99.8% by mass, and further preferably 80.0 to 99.7% by mass in the total content of 100% by mass of all the monomers constituting the copolymer.

A method for synthesizing chloroprene-based polymer latex in the present invention is not particularly limited. The production method of the present invention can be applied to chloroprene-based polymer latex obtained by a well-known synthesis method. The chloroprene-based polymer latex can be synthesized, for example, by the method described in Synthesis Example mentioned below.

[Residual Volatile Organic Substances]

Examples of the residual volatile organic substances contained in the chloroprene-based polymer latex include unreacted monomers in polymerization reaction in the production of the latex (residual monomers) and an organic solvent used in the production process (residual organic solvent).

The residual monomers are unreacted monomers among the monomers constituting the above-mentioned chloroprene-based polymer, and are mainly a chloroprene monomer which is the main ingredient of the chloroprene-based polymer. It is preferable that these residual monomers be removed from the viewpoint of maintaining the quality, properties, and the like of the latex satisfactorily. Especially the chloroprene monomer is a residual monomer which can be contained as the main ingredient in the largest amount, and the chloroprene monomer is preferably removed from the latex in an amount as large as possible.

Examples of the residual organic solvent include aliphatic hydrocarbon solvents such as pentane, hexane, and heptane; alicyclic hydrocarbon solvents such as cyclopentane, cyclohexane, and methylcyclohexane; alcoholic solvents such as methanol, ethanol, and isopropanol; aromatic hydrocarbon solvents such as toluene and xylene; ether solvents such as tetrahydrofuran, diethyl ether, cyclopentyl methyl ether, and 4-methylcyclohydropyran; ester solvents such as ethyl acetate, propyl acetate, and butyl acetate; and ketone solvents such as acetone, methyl ethyl ketone, and cyclopentanone.

The concentration of the residual volatile organic substances contained in the latex before the latex is contacted with the mixed fluid is preferably 150 to 10000 ppm by mass, more preferably 175 to 5000 ppm by mass, and further preferably 200 to 1000 ppm by mass based on the total mass of the latex.

When the concentration of the residual volatile organic substances is 150 ppm by mass or more, the present invention is advantageously applied to further reduce the concentration. If the concentration is 10000 ppm by mass or less, the concentration can be further reduced efficiently.

According to the present invention, the residual volatile organic substances in the latex are removed, and the concentration of the residual volatile organic substances decreases. The concentration of the residual volatile organic substances is reduced to preferably less than 150 ppm by mass, more preferably 140 ppm by mass or less, further preferably 100 ppm by mass or less, and more further preferably 50 ppm by mass or less based on the total mass of the latex.

[Inert Gas and/or the Like]

The inert gas and/or the like mentioned in the present invention may be gas which hardly chemically reacts with the chloroprene-based polymer latex, and is selected from the group consisting of inert gases and air. Examples of the inert gases include noble gases such as argon; and nitrogen gas. Although the air may be the atmosphere, the air does not preferably contain acidic gas such as carbon dioxide, and is more preferably synthetic air obtained by mixing oxygen gas and nitrogen gas artificially as air having lower reactivity.

The inert gas and/or the like may be used alone or in combination of two or more. Among these, nitrogen gas and/or air is preferable from the viewpoints of handleability, cost, and the like.

[Mixed Fluid]

The mixed fluid to be contacted with the latex is a mixed fluid of the inert gas and/or the like and water. Liquid and gas (water vapor) are also included in the "water" in the mixed fluid.

In conventional stripping in which only water (water vapor) is contacted with latex, the temperatures of water and the latex at the time of contact with the latex need to be adjusted to high temperatures so as to be close or superior to the boiling point of water, and the agglomerates deposit easily.

Meanwhile, when only the inert gas and/or the like is contacted with the latex, moisture in the latex evaporates into an atmosphere such as the inert gas and/or the like, and the agglomerates deposits easily. In this case, as a factor in which the agglomerates deposits, it can be considered that micells of latex particles are unstabilized or broken due to local dryness on the surface of the latex in contact with the inert gas and/or the like.

For this reason, in the present invention, water is contacted with the latex along with the inert gas and/or the like to such an extent that the latex surface in contact with the inert gas and/or the like is not dried when the inert gas and/or the like is contacted to suppress the deposition of the agglomerates.

Since the amount of water in the mixed fluid varies depending on the composition, the solid concentration, or the like of the latex, the amount is not unconditionally determined. For example, the amount can however be defined by the volume ratio of the nitrogen flow rate to the water flow rate under the standard conditions (0° C., 101.3 kPa).

The volume ratio of the nitrogen flow rate to the water flow rate ($N_2$ flow rate/$H_2O$ flow rate) is preferably 0.05 to 1.00, more preferably 0.10 to 0.75, and further preferably 0.15 to 0.50 from the viewpoint of suppressing the deposition of the agglomerates from the latex.

Although the temperature of the mixed fluid is preferably high to volatilize the residual volatile organic substances and remove the residual volatile organic substances efficiently, the temperature is preferably as low as possible from the viewpoint of preventing the agglomerates from depositing from the latex.

In the present invention, the residual volatile organic substances can be efficiently removed at treatment temperature lower than before by contacting the mixed fluid with the latex at a gas pressure higher than the saturated water vapor pressure at the latex liquid temperature and temperature lower than the boiling point of water at the gas pressure.

When the gas pressure of the mixed fluid when the mixed fluid is contacted with the latex is lower than the saturated water vapor pressure at the latex liquid temperature, the latex surface dries locally by water boiling, and agglomerates deposit easily. However, it is preferable that the gas pressure of the mixed fluid be not too high to be the saturated water vapor pressure at the liquid temperature of the latex from the viewpoint of preventing a time taken to perform the operation for removing residual volatile organic substances from being too long.

The gas pressure of the mixed fluid is higher than the saturated water vapor pressure, and the gas pressure difference between both is preferably 0.1 to 30.0 kPa, more preferably 0.2 to 20.0 kPa, and further preferably 0.3 to 10.0 kPa.

When the temperature of the mixed fluid when the mixed fluid is contacted with the latex is higher than the boiling point of water at the gas pressure at the time of the contact, moisture in the latex locally evaporates easily, and the agglomerates deposit easily. However, it is preferable that the temperature of the mixed fluid be not too low to be the boiling point of water at the gas pressure at the time of the contact from the viewpoint of preventing time taken to perform the operation for removing residual volatile organic substances from being too long.

The temperature of the mixed fluid when the mixed fluid is contacted with latex is lower than the boiling point of water at the gas pressure at the time of the contact, and the temperature difference between both is preferably 0.5 to 50.0° C., more preferably 1.0 to 30.0° C., and further preferably 1.2 to 10.0° C.

As the temperature of the chloroprene-based polymer latex becomes higher, chlorine atoms in the polymer becomes more easily eliminated as hydrogen chloride over time. The dispersion state is easily unstabilized due to a decrease in the pH of the latex, and the modification and the quality deterioration occurs easily due to a decrease in the crosslinking point. It is considered that the degree of the progress of hydrogen chloride elimination depends almost only on the temperature.

Therefore, the temperature of the latex is preferably reduced from the viewpoint of suppressing the elimination of hydrogen chloride from the polymer.

The amount of hydrogen chloride eliminated can be confirmed using a change in the chlorine ion concentration, the pH, the concentration of the alkali residue (hydroxide ions), or the like in the latex as an index.

The temperature of the latex to be contacted with the mixed fluid is preferably maintained at 10 to 60° C., more preferably 20 to 55° C., and further preferably 30 to 50° C.

The temperature of the mixed fluid to be contacted with the latex is preferably 10 to 60° C., more preferably 20 to 55° C., and further preferably 30 to 50° C.

It is preferable that the temperature of the latex and the temperature of the mixed fluid be almost equivalent from the viewpoint of the ease of temperature control in the operation for removing residual volatile organic substances.

[Method and Device]

The method and the device for contacting the mixed fluid with the latex are not particularly limited, and are suitable if they can perform the operation for removing residual volatile organic substances in the latex under the above-mentioned conditions of gas pressure and temperature. Examples include methods such as mixing in piping, blowing the mixed fluid into the container such as a tank, and counter current contact using a stripping tower. Among these, blowing the mixed fluid into the container is preferable from the viewpoints of the ease of device maintenance and extension, cost, and the like. In this case, it is preferable to perform so-called bubbling in which the mixed fluid is blown into the latex from the viewpoint of contacting the mixed fluid with the latex uniformly and efficiently. At that time, it is preferable to stir the latex.

As long as, in the production method of the present invention, the present invention's effect of suppressing the deposition of the agglomerates from latex is not prevented, other methods such as distillation, adsorption, and spraying may be used in combination to remove the residual volatile organic substances in the latex.

The method for warming latex when the mixed fluid is contacted with the latex is not particularly limited. The latex can be warmed, for example, with the jacket of the container, a heat exchanger inside or outside the container, and a heater or by water vapor contact. It is preferable to warm the latex with warm water using the jacket of the container or/and the heat exchanger outside the container from the viewpoint of suppressing an excessive increase in temperature.

The method for warming the mixed fluid is not particularly limited, either, and the mixed fluid can be warmed, for example, with a heat exchanger or a heater. When the inert gas and/or the like and water are mixed, it is preferable to adjust the temperature to desired temperature with water vapor from the viewpoints of the ease of operation, cost, and the like.

Although the contact time of the mixed fluid and the latex is suitably set depending on the amount of the latex, the concentration of the residual volatile organic substances in the latex, device scale, and the like, the contact time is preferably around 0.5 to 20.0 hours, more preferably 1.0 to 15.0 hours, and further preferably 1.5 to 12.0 hours from the viewpoints of efficiency in removing the residual volatile organic substances, cost, the suppression of the deposition of the agglomerates, the suppression of the elimination of hydrogen chloride from the chloroprene-based polymer by warming, and the like.

EXAMPLES

Although the present invention will be described specifically hereinafter by the Examples, the present invention is not limited to the following Examples.

[Synthesis Example of Chloroprene-Based Polymer Latex]

A reactor with a capacity of 60 L was charged with 18.2 kg of 2-chloro-1,3-butadiene (chloroprene) (produced by Tokyo Chemical Industry Co., Ltd.) and 1.8 kg of 2,3-dichloro-1,3-butadiene (produced by Tokyo Chemical Industry Co., Ltd.) as monomers, 18 kg of pure water, 860 g of disproportionated rosin acid ("R-300" produced by ARAKAWA CHEMICAL INDUSTRIES, LTD.), 20.0 g of n-dodecyl mercaptan (produced by Tokyo Chemical Industry Co., Ltd.), 240 g of potassium hydroxide (produced by JUNSEI CHEMICAL CO., LTD.), and 160 g of a sodium salt of (3-naphthalene sulfonic acid formalin condensate (produced by Kao Corporation).

These charge raw materials were emulsified to prepare disproportionated rosin acid into rosin soap, and potassium persulfate (produced by MITSUBISHI GAS CHEMICAL COMPANY, INC.) was then added as an initiator for polymerization at 40° C. in a nitrogen atmosphere. When the polymerization conversion rate reached 88.1%, an emulsion of phenothiazine was added immediately, and the polymerization was stopped.

Subsequently, treatment for removing the residual monomers was performed by steam distillation to obtain chloroprene-based polymer latex (solid concentration: 59% by mass).

The solid concentration is found using the following expression by collecting latex after polymerization, measuring the mass $M_1$, and measuring the mass $M_2$ of solid contents after this collected latex was dried at 140° C. for 25 minutes.

Solid concentration[% by mass]=$M_2/M_1 \times 100$

The polymerization conversion rate was found as the ratio of the amount of the chloroprene-based polymer generated to the charge amount of the monomers. The amount of the chloroprene-based polymer generated was an amount obtained by deducting the solid content other than the chloroprene-based polymer (emulsifier and the like) from the solid content after polymerization. The solid content other than the chloroprene-based polymer was an amount obtained by deducting the amount of components which do not volatilize at 140° C. other than the monomers from the amount of the charge raw materials.

[Test on Removing Residual Volatile Organic Substances in Latex]

Tests on removing the residual volatile organic substances were performed using the chloroprene-based polymer latex obtained in the above-mentioned Synthesis Example.

FIG. 1 shows the outline of a device used in the following Examples and Comparative Examples. In the device shown in FIG. 1, a separable flask is used as a container 1, and the container 1 includes stirring blades 2 rotated by an external motor (not shown), a mixed fluid introducing pipe 4 for introducing a mixed fluid near the bottom in the container 1, pressure reducing piping 5 at the top of the container 1, a thermometer (not shown), and a pressure gauge (not shown).

A vaporizer and the pressure gauge are connected to the mixed fluid introducing pipe 4. Latex 6 was warmed using a water bath, and the pressure in the container 1 was reduced through the pressure reducing piping 5 using a diaphragm pump 8.

As a mixed fluid 3, a mixed fluid of nitrogen gas 9 and water was used. The flow rate of the nitrogen gas 9 was adjusted with a mass flow meter 10. Pure water 11 was fed to the vaporizer 13 with a liquid-feeding pump 12 and heated with the vaporizer 13, nitrogen gas 9 was introduced into the vaporizer 13 to prepare the mixed fluid 3. The flow rate of water was adjusted by adjusting the amount of the pure water 11 fed to the vaporizer 13. The temperature of the mixed fluid 3 was adjusted using a tape heater (not shown) wound around the mixed fluid introducing pipe 4.

In the device having the above-mentioned configuration, the container 1 was charged with the latex 6. The mixed fluid 3 of the nitrogen gas 9 and water was blown into the latex 6 from the mixed fluid introducing pipe 4 while the latex 6 was stirred with the stirring blades 2. The gas pressure in the container 1 (operating gas pressure) was adjusted through the pressure reducing piping 5.

Example 1

First, 500 mL of latex 6 was warmed to 40° C., and the operating gas pressure $P_1$ was reduced to 8.0 kPa. A mixed fluid 3 of nitrogen gas 9 ($N_2$; flow rate: 5.2 mL/min (standard conditions: 0° C., 101.3 kPa)) and water ($H_2O$; flow rate: 34.5 mL/min (standard conditions)) was blown into latex 6 with the temperature $T_G$ adjusted to 40° C.

Examples 2 to 7 and Comparative Examples 1 to 4

The liquid temperature and the volume of latex 6, the operating gas pressure $P_1$, the flow rates of the nitrogen gas 9 and water, and the temperature $T_G$ of the mixed fluid 3, which were set in Example 1, were changed into the test conditions as shown in the following Table 1. Tests were performed in the same way as in Example 1 thereexcept.

Comparative Example 1 is a blank when the mixed fluid 3 was not blown (mixed fluid was not introduced).

Since, in Comparative Example 2, the mixed fluid introducing pipe 4 was clogged with agglomerates around 30 minutes after the start of the test, the test was interrupted.

Since, in Comparative Example 4, foam increased in the container 1 from immediately after the start of test, the test was interrupted 10 minutes after.

[Various Analysis Evaluations]

In the tests performed in the above-mentioned Examples and Comparative Example, the following items were analyzed and evaluated. The results of these analysis evaluations are shown together in the following Table 1. The description "–" in Table 1 means that the item was not measured.
(Temperature)

The temperature was measured using K thermocouples specified in JIS C 1602:2015 with insertion pipes passed through measurement portions.
(Operating Gas Pressure)

The operating gas pressure was measured with a Pirani vacuum gauge (manufactured by VACUUBRAND GMBH+ COKG., "DVR2pro").
(Quantification of Residual Volatile Organic Substances)

It was considered that a chloroprene monomer which was a residual monomer after the polymerization reaction of the above-mentioned Synthesis Example was a residual volatile organic substance, the residual volatile organic substance was measured under the following measurement conditions by high performance liquid chromatography.
<Measurement Conditions>
  Measurement sample: A solution prepared by mixing extract of chloroprene obtained by adding 20 g of cyclohexane (produced by JUNSEI CHEMICAL CO., LTD.) to 0.1 g of latex for mixing with a solution obtained by diluting butyl propionate with cyclohexane 100 times (based on volume) at a mass ratio 9:1
  Measuring equipment: High performance liquid chromatograph; "Prominence (R)" manufactured by SHIMADZU CORPORATION
  Detector: UV 220 nm
  Column: "Shodex (R) Asahipak (R) ODP-50 4D" manufactured by SHOWA DENKO K.K.
  Column temperature: 40° C.
  Eluate: Acetonitrile/water=6/4 (volume ratio)
  Flow velocity: 0.8 mL/min
  Injection volume: 10 μL
  Internal standard substance: Butyl propionate It was observed that the concentration of the residual volatile organic substance in the latex 6 after time for which the removal test was performed t [h] C(t) [ppm by mass] decreased according to the following Expression (2) with the concentration of the residual volatile organic substance before the removal test defined as $C_0$ [ppm by mass] and the removal rate constant defined as k [$h^{-1}$].

$$C(t)=C_0 \cdot \exp(-k \cdot t) \qquad (2)$$

The removal rate constant k is an index of efficiency in removing the residual volatile organic substance. It is shown that as the value becomes larger, the efficiency in removing the residual volatile organic substance becomes higher.
(Presence or Absence of Agglomerates)

It was visually confirmed whether agglomerates in the latex 6 after the removal test were deposited or not and whether agglomerates were attached to the inside wall of the container 1, the stirring blades 2, and the mixed fluid introducing pipe 4 or not.
(Amount of Decrease in Alkali Residue)

The alkali residue (the amount of hydroxide ions) in latex 6 A was found by neutralization titration with hydrochloric acid, and the amount of decrease from the alkali residue before the removal test $A_0$ ($A_0$-A) was calculated and used as an index of the amount of hydrogen chloride eliminated from the chloroprene-based polymer in the latex 6. In the above-mentioned removal test, the amount of decrease in the alkali residue 6 hours after the start of the test was found.

It can be said that as the value of the amount of decrease in alkali residue becomes larger, the amount of hydrogen chloride eliminated from the chloroprene-based polymer becomes larger, and the modification of latex proceeds.

As a surface-active substance, 20 mL of "emulgen (R) 709" (trade name, produced by Kao Corporation) was specifically added to 100 g of latex 6 to maintain the disperse state at the time of titration, 0.5 mol/L hydrochloric acid (factor: f) was then dropped using a buret until the pH was 10.5 (the first neutral point). The alkali residue A was found from this dropping amount D [mL] using the following Expression (3).

$$A\ [mmol/100\ g] = f \cdot D \cdot 0.5 \qquad (3)$$

TABLE 1

|  | Example | | | | | | | Comparative Example | | | |
|---|---|---|---|---|---|---|---|---|---|---|---|
|  | 1 | 2 | 3 | 4 | 5 | 6 | 7 | 1 | 2 | 3 | 4 |
| Latex | | | | | | | | | | | |
| Liquid temperature [° C.] | 40 | 30 | 50 | 40 | 40 | 40 | 40 | 40 | 40 | 40 | 41.5 |
| Saturated water vapor pressure $P_S$ [kPa] | 7.4 | 4.2 | 12.3 | 7.4 | 7.4 | 7.4 | 7.4 | 7.4 | 7.4 | 7.4 | 8.0 |
| Liquid volume [mL] | 500 | 500 | 500 | 500 | 500 | 3000 | 3000 | 3000 | 500 | 500 | 500 |
| Operating gas pressure $P_1$ [kPa] | 8.0 | 4.7 | 13.2 | 13.1 | 35.0 | 9.0 | 9.0 | 9.0 | 9.0 | 9.0 | 8.0 |
| Boiling point of water $T_B$ [° C.] | 41.5 | 31.8 | 51.4 | 51.2 | 72.7 | 43.8 | 43.8 | 43.8 | 43.8 | 43.8 | 41.5 |
| Mixed fluid | | | | | | | | | | | |
| $N_2$ flow rate [mL/min (standard conditions)] | 5.2 | 5.2 | 5.2 | 5.2 | 5.2 | 31.7 | 31.7 | 0 | 5.2 | 5.2 | 5.2 |
| $H_2O$ flow rate [mL/min (standard conditions)] | 34.5 | 52.5 | 34.5 | 26.2 | 11.1 | 157.5 | 74.3 | 0 | 0 | 34.5 | 34.5 |
| $N_2$ flow rate/$H_2O$ flow rate | 0.15 | 0.10 | 0.15 | 0.20 | 0.47 | 0.20 | 0.43 | | | 0.15 | 0.15 |
| Temperature $T_G$ [° C.] | 40 | 30 | 50 | 40 | 40 | 40 | 40 | 40 | 40 | 50 | 40 |
| $P_1 - P_S$ [kPa] | 0.6 | 0.5 | 0.9 | 5.7 | 27.6 | 1.6 | 1.6 | 1.6 | 1.6 | 1.6 | 0 |
| $T_G - T_B$ [° C.] | -1.5 | -1.8 | -1.4 | -11.2 | -32.7 | -3.8 | -3.8 | -3.8 | -3.8 | 6.2 | -1.5 |

TABLE 1-continued

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| Concentration of residual volatile organic substance(s) [ppm by mass] | | | | | | | | | | | |
| Before test start | 335 | 348 | 312 | 348 | 360 | 381 | 203 | 219 | — | 496 | — |
| 1.5 hours after | 132 | 163 | 122 | 238 | 283 | — | — | — | — | — | — |
| 6 hours after* | 7 | (17) | (7) | (76) | (138) | 65 | 12 | 212 | — | 1 | — |
| Removal rate constant k [h⁻¹] | 0.645 | 0.506 | 0.626 | 0.253 | 0.160 | 0.295 | 0.471 | 0.005 | — | 1.034 | — |
| Agglomerates | Not deposited | Not deposited | Not deposited | Not deposited | Not deposited | Not deposited | Not deposited | Not deposited | Deposited | Deposited | Deposited |
| Amount of decrease in alkali residue (6 hours after) [mmol/100 g] | 0.16 | — | — | — | — | 0.10 | 0.04 | 0.10 | — | 0.29 | — |

(Note)
*Values between brackets are calculated values.

As found from the results shown in Table 1, it was observed that the residual volatile organic substance can be efficiently removed without depositing agglomerates in latex and the device by introducing the mixed fluid of nitrogen gas and water into the latex at an operating gas pressure higher than a saturated water vapor pressure at a latex liquid temperature and at a temperature lower than the boiling point of water at the operating gas pressure.

It can be said that, in Examples 1, 6, and 7, the amounts of decrease in the alkali residue when the temperatures of the latex and mixed fluids were 40° C., and the test time was 6 hours were almost equivalent to a blank, in which no mixed fluid was introduced, (Comparative Example 1) or less, and the latex was not modified markedly by the elimination of hydrogen chloride from the chloroprene-based polymer.

When the temperature $T_G$ of the mixed fluid was higher than the boiling point of water $T_B$ at the operating gas pressure (Comparative Example 3: $T_G$-$T_B$>0), the efficiency in removing the residual volatile organic substance was high, the agglomerates however deposited in the latex. The amount of decrease in the alkali residue is markedly large as compared with a blank, in which no mixed fluid is introduced, (Comparative Example 1), it can be said that the latex is markedly modified by the elimination of hydrogen chloride from the chloroprene-based polymer.

When the operating gas pressure $P_1$ was equal to the saturated water vapor pressure $P_s$ at the liquid temperature of the latex (Comparative Example 4: $P_1$·$P_S$=0), as mentioned above, foam increased, the test was therefore interrupted, and it was also confirmed that agglomerates attached to the inside wall of the container.

REFERENCE SIGNS LIST

1: Container
2: Stirring blades
3: Mixed fluid
4: Mixed fluid introducing pipe
5: Pressure reducing piping
6: Latex
7: Water bath
8: Diaphragm pump
9: Nitrogen gas
10: Mass flow controller
11: Pure water
12: Liquid-feeding pump
13: Vaporizer

The invention claimed is:

1. A method for producing a chloroprene-based polymer latex,
wherein when a residual volatile organic substance comprised in the latex is volatilized and removed, a mixed fluid of one or more gases selected from inert gases and air, and water is contacted with the latex at a gas pressure higher than a saturated water vapor pressure at a liquid temperature of the latex,
a temperature of the mixed fluid is a temperature lower than a boiling point of water at the gas pressure, and
the temperature of the latex contacted with the mixed fluid is 10 to 60° C.

2. The method for producing a chloroprene-based polymer latex according to claim 1, wherein the temperature of the mixed fluid contacted with the latex is 10 to 60° C.

3. The method for producing a chloroprene-based polymer latex according to claim 1, wherein the mixed fluid is contacted with the latex by blowing the mixed fluid into the latex liquid.

4. The method for producing a chloroprene-based polymer latex according to claim 1, wherein a concentration of the residual volatile organic substance comprised in the latex before the latex is contacted with the mixed fluid is 150 to 10000 ppm by mass based on a total mass of the latex.

5. The method for producing a chloroprene-based polymer latex according to claim 1, wherein the concentration of the residual volatile organic substance comprised in the latex is reduced to less than 150 ppm by mass based on the total mass of the latex.

6. The method for producing a chloroprene-based polymer latex according to claim 1, wherein the residual volatile organic substance is a residual monomer in polymerization reaction in production of the latex.

7. The method for producing a chloroprene-based polymer latex according to claim 1, wherein the inert gases are selected from noble gases and nitrogen gas.

8. The method for producing a chloroprene-based polymer latex according to claim 1, wherein the inert gases are selected from argon and nitrogen gas.

* * * * *